US010327129B2

(12) United States Patent
Ianev et al.

(10) Patent No.: US 10,327,129 B2
(45) Date of Patent: Jun. 18, 2019

(54) COMMUNICATION SYSTEM

(71) Applicant: NEC Corporation, Tokyo (JP)

(72) Inventors: Iskren Ianev, Middlesex (GB);
Yannick Lair, Voisins le Bretonneux (FR); Hayato Haneji, Tokyo (JP);
Christophe Le Thierry D'Ennequin, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/123,631

(22) PCT Filed: Feb. 19, 2015

(86) PCT No.: PCT/JP2015/000778
§ 371 (c)(1),
(2) Date: Sep. 2, 2016

(87) PCT Pub. No.: WO2015/133078
PCT Pub. Date: Sep. 11, 2015

(65) Prior Publication Data
US 2017/0078867 A1    Mar. 16, 2017

(30) Foreign Application Priority Data
Mar. 4, 2014    (GB) .................................. 1403819.4

(51) Int. Cl.
*H04W 72/00*        (2009.01)
*H04W 8/06*         (2009.01)
(Continued)

(52) U.S. Cl.
CPC ........... *H04W 8/065* (2013.01); *H04W 24/08* (2013.01); *H04W 28/02* (2013.01); *H04W 76/27* (2018.02); *H04W 88/02* (2013.01)

(58) Field of Classification Search
CPC ..... H04W 8/065; H04W 24/08; H04W 28/02; H04W 76/046; H04W 88/02; H04W 48/20; H04W 28/08; H04W 36/22; H04W 4/005
See application file for complete search history.

(56) References Cited

U.S. PATENT DOCUMENTS

2010/0124933 A1* 5/2010 Chowdhury ........ H04L 41/0896
455/453
2012/0302230 A1  11/2012 Lim et al.
(Continued)

FOREIGN PATENT DOCUMENTS

EP    2 161 963 A1    3/2010
EP    2 523 505 A1   11/2012
(Continued)

OTHER PUBLICATIONS

Notification of Reasons for Refusal issued by Japanese Patent Office dated Jun. 6, 2017, in counterpart Japanese application No. 2016-554292.
(Continued)

*Primary Examiner* — Barry W Taylor
(74) *Attorney, Agent, or Firm* — Finnegan, Henderson, Farabow, Garrett & Dunner, L.L.P.

(57) ABSTRACT

A communication system is disclosed in which a control node generates configuration data for each of a plurality of MMEs operating in overlay networks. The configuration data defines a type of user equipment (UE) or a type of UE traffic to be serviced by each MME. The MME configuration data is provided to a base station and used to control selection of an MME to service a request from a UE. The control node monitors network traffic within and across the overlay networks and can reconfigure one or more MMEs to
(Continued)

service different UE traffic types. This allows for improved flexibility in load balancing with overlay networks

15 Claims, 12 Drawing Sheets

(51) Int. Cl.
*H04W 24/08* (2009.01)
*H04W 28/02* (2009.01)
*H04W 76/27* (2018.01)
*H04W 88/02* (2009.01)

(56) References Cited

U.S. PATENT DOCUMENTS

| | | | |
|---|---|---|---|
| 2013/0095834 A1* | 4/2013 | Hou | H04W 28/08 455/436 |
| 2013/0100813 A1 | 4/2013 | Velamati et al. | |
| 2015/0056994 A1* | 2/2015 | Jain | H04W 76/048 455/435.2 |
| 2016/0057681 A1* | 2/2016 | Wang | H04W 8/02 370/331 |

FOREIGN PATENT DOCUMENTS

| WO | WO 2006/114628 A2 | 11/2006 |
|---|---|---|
| WO | WO 2009/096833 A1 | 8/2009 |
| WO | WO 2010/057198 A1 | 5/2010 |
| WO | WO 2013/051845 A2 | 4/2013 |

OTHER PUBLICATIONS

NTT DOCOMO, Intel, "Use of Low Access Priority Indication to select MME", 3GPP TSG-SA WB2#97, S2-132262, (May 31, 2013).

Intel Corporation, "Low Access Priority Indicator (LAPI) for selection of MME" 3GPP TSG-RAN WG3#81, R3-131459, (Aug. 23, 2013).

International Search Report and Written Opinion dated Jun. 1, 2015, in corresponding PCT International Application.

3GPP TS 23.401 V12.3.0, $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12), pp. 1-301, Dec. 2013.

Motorola, "Reactive Load Management for MTC Devices", 3GPP TSG SA WG2 Meeting #79E (Electronic), TD S2-103176, Jul. 2010.

Search Report issued in the Priority GB Application dated Jun. 13, 2014.

NTT DOCOMO, Intel, "Use of Low Access Priority Indication to Select MME", 3GPP TSG-SA WG2#97, 82-132262, (May 31, 2013).

Communication pursuant to Article 94(3) EPC (EPO Office Action) dated Jan. 22, 2018, issued by the European Patent Office in counterpart European Patent Application No. 15 708 894.9.

* cited by examiner

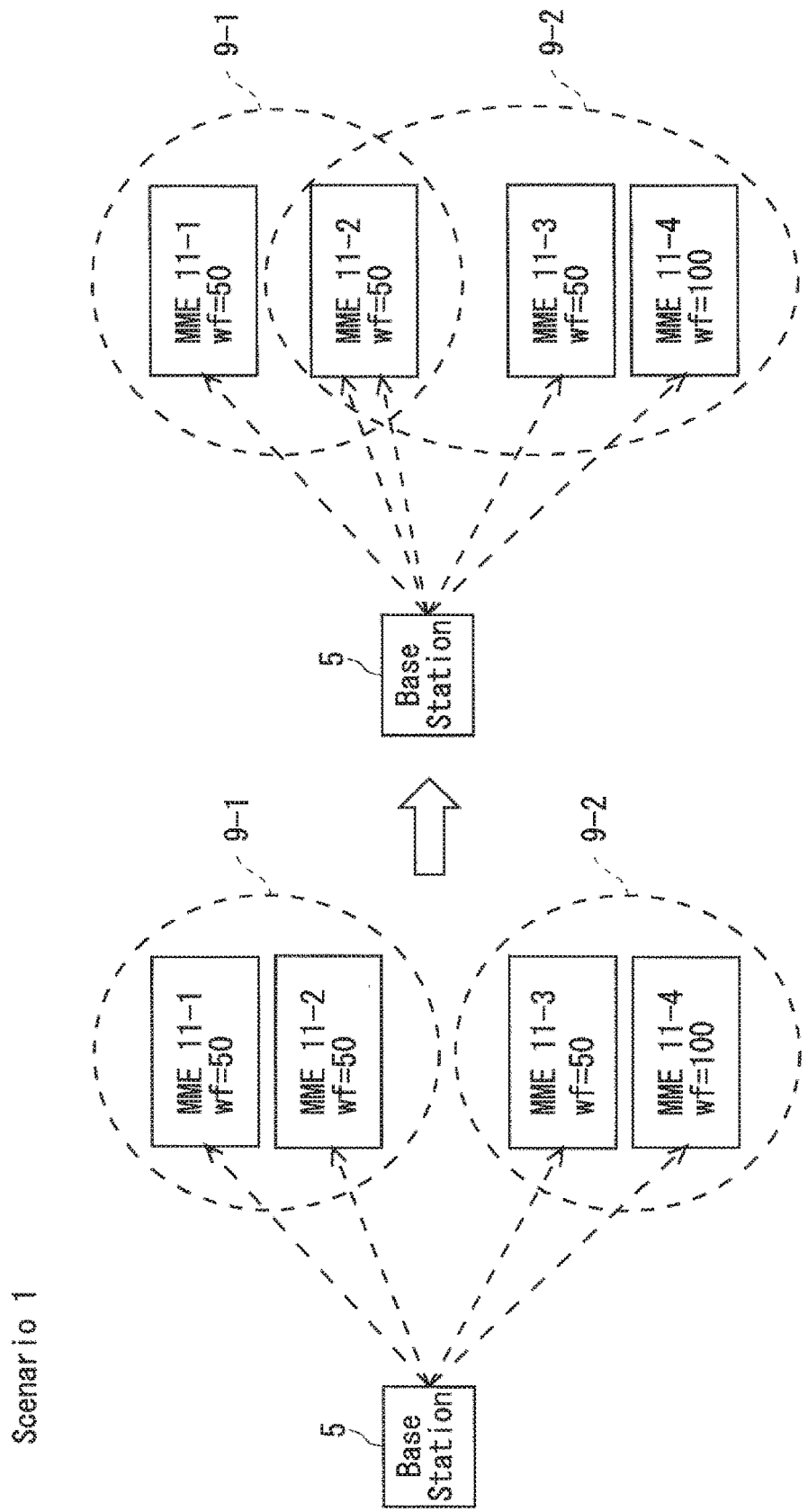

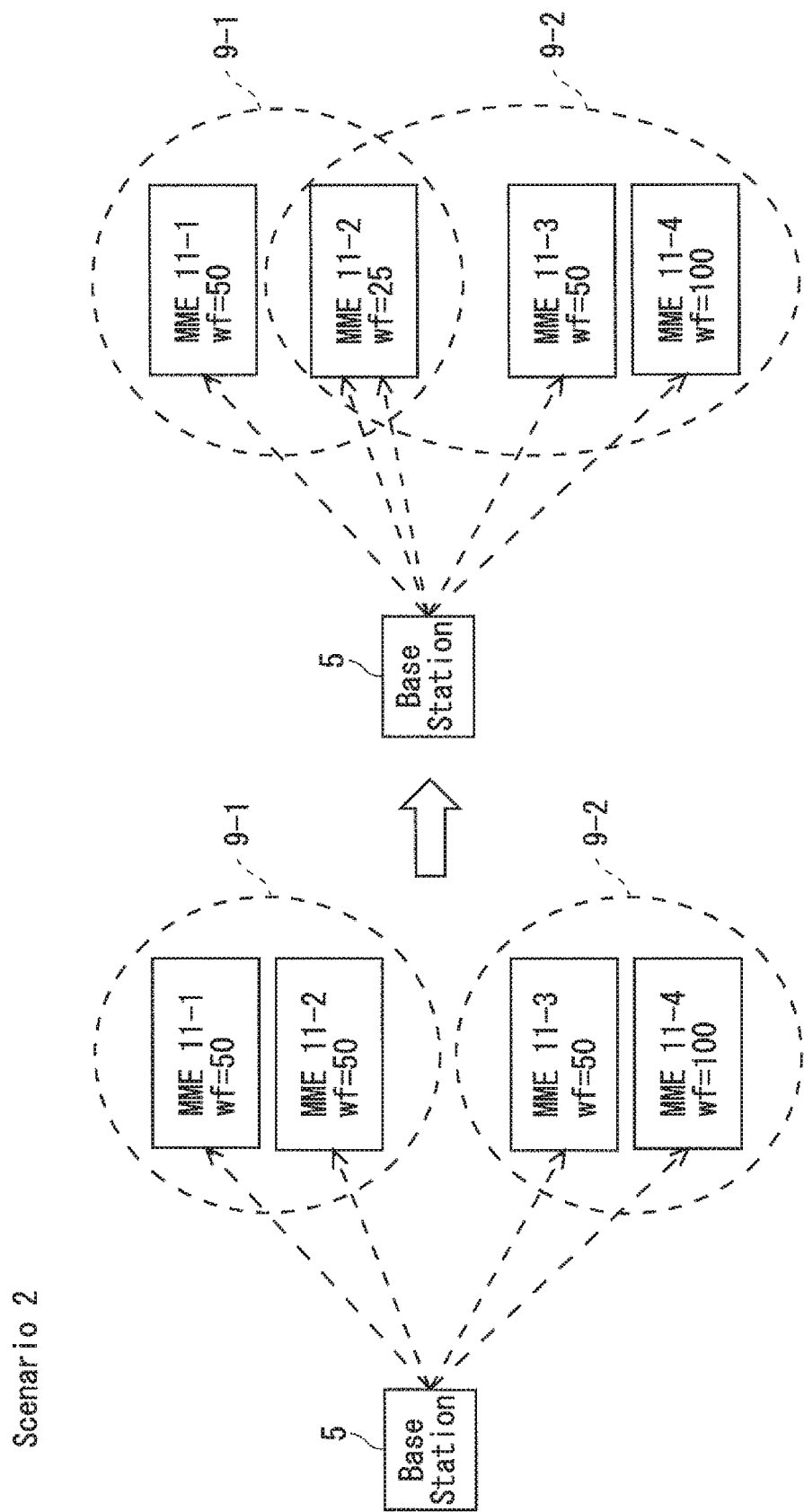

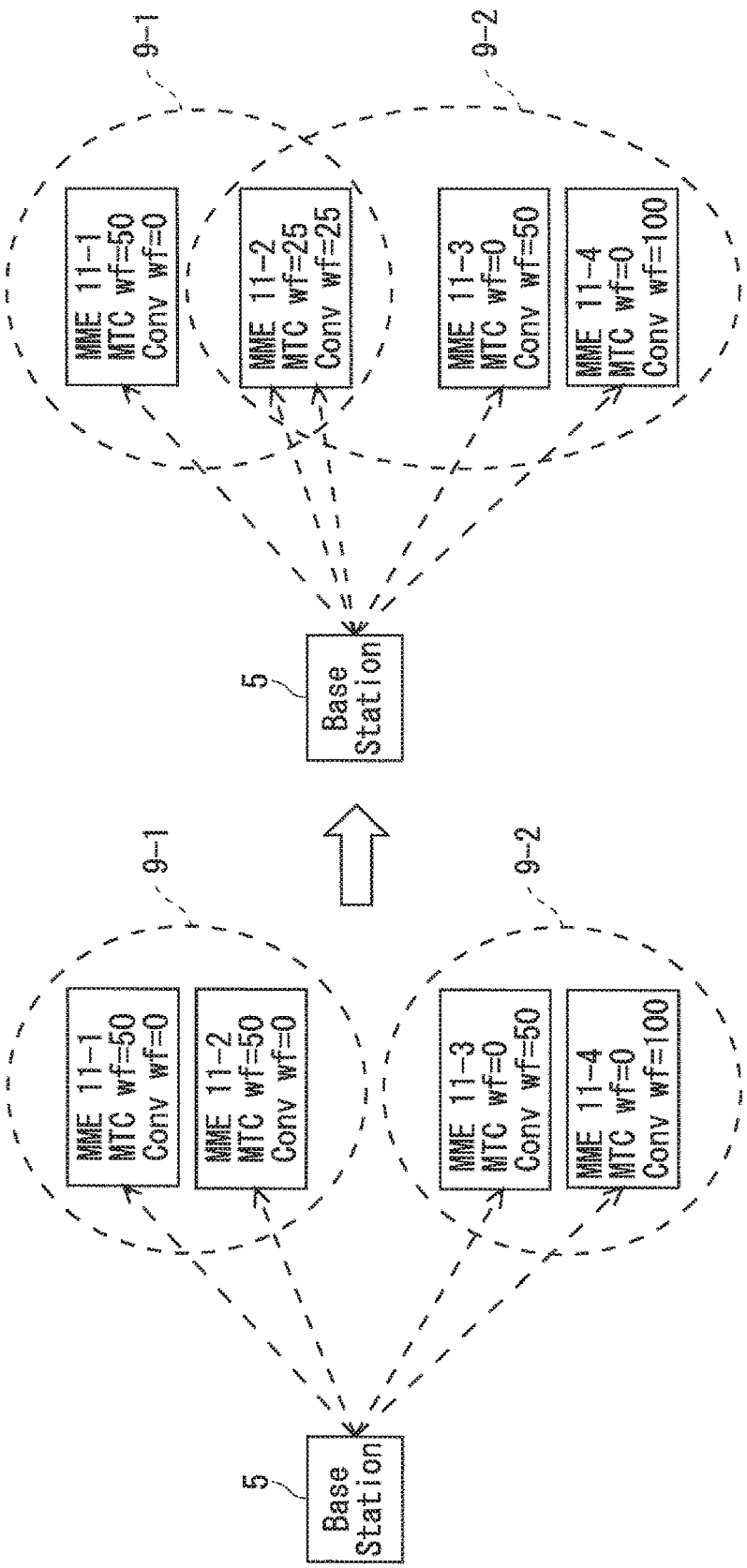

COMMUNICATION SYSTEM

CROSS-REFERENCE TO RELATED PATENT APPLICATIONS

This application is a National Stage Entry of International Application No. PCT/JP2015/000778, filed Feb. 19, 2015, which claims priority from GB 1403819.4, filed Mar. 4, 2014. The entire contents of the above-referenced applications are expressly incorporated herein by reference.

TECHNICAL FIELD

The present invention relates to a communication system and to parts and methods thereof. The invention has particular but not exclusive relevance to wireless communication systems and devices thereof operating according to the 3GPP (third generation partnership project) standards or equivalents or derivatives thereof.

BACKGROUND ART

Wireless communication systems enable users of User Equipment (UE) to communicate with other such users via one of a number of base stations and via one or a number of core networks. Typically, the UEs are mobile terminals, such as mobile (cellular) telephones and the like, although the term UE may also refer to generally stationary communication devices, such as laptop computers, web browsers, machine-type communication devices, and the like. In the following description the term user equipment is used, which is intended to cover any type of such user equipment (mobile and stationary).

In an active or connected state a UE is registered with the network and has a Radio Resource Control (RRC) connection with a base station so that the network knows to which base station (or cell thereof) the user communication device belongs and can transmit data to and receive data from the user communication device.

A Mobility Management Entity (MME) in the core network manages general mobility aspects of the UEs and ensures that connectivity is maintained with the UEs, for example as they are moving within the geographical area covered by the communication system (and/or as they are handed over between base stations of the communication system due to movement or changes in communication conditions). The MME also manages the various bearers associated with the UEs by controlling the other network nodes via which such bearers are provided. In order to do so, the MME exchanges Non-Access Stratum (NAS) signalling messages with the UEs (and/or the other network nodes) to manage the establishment of a communication session there between.

SUMMARY OF INVENTION

Technical Problem

As part of the Long Term Evolution (LTE) of UTRAN (UMTS Terrestrial Radio Access Network) referred to as E-UTRAN, there is a growing interest from operators in deploying specialised Public Land Mobile Networks (PLMNs) or specialised communication nodes within a PLMN (such as specialised MMEs) that are dedicated for a particular type of user equipment. This provides advantages in terms of scaling for specific users or traffic types and isolating specific usage and/or specific traffic. Such specialised networks also offer the advantage of being able to build simple networks for some specialised services and more complex networks for more complex services. This will also prevent any overload caused by one type of user from affecting other types of users. These specialised networks are called "overlay networks" in the 3GPP. However, providing completely separate networks for different types of user can lead to an inefficient use of the network resources.

One aim of the invention is to provide for an efficient way to operate such overlay networks whilst allowing load balancing between the network nodes.

Solution to Problem

According to one aspect, the present invention provides a control node for controlling overlay networks that use a plurality of Mobility Management Entities, MMEs, and one or more base stations, the control node comprising: means for assigning each MME to service one or more different types of user equipment, UE, or UE traffic; and means for monitoring loading within the overlay networks; wherein said means for assigning is arranged to reassign one or more MMEs to service another type of UE or UE traffic in response to said means for monitoring identifying an overload within or across said overlay networks. According to one aspect, the present invention provides a control node for controlling overlay networks that use a plurality of Mobility Management Entities, MMEs, and one or more base stations, the operator control node comprising: means for assigning each MME to service one or more different types of user equipment, UE, or UE traffic; and means for monitoring loading within the overlay networks; wherein said means for assigning is arranged to reassign one or more MMEs to service another type of UE or UE traffic in response to said means for monitoring identifying an overload within or across said overlay networks.

In one embodiment, the means for assigning is arranged to assign one or more MME types to each MME, each MME type defining a type of UE or a type of UE traffic that the MME is configured to serve. The means for assigning may be arranged to assign one or more weight factors to each MME, the weight factor indicating a processing power of the MME relative to a processing power of the other MMEs in the overlay networks. In this case, when the means for assigning reassigns one or more MMEs to service another type of UE or UE traffic, the means for assigning changes one or more weight factors associated with each of the one or more MMEs that are reassigned. In one embodiment, the control node assigns, to each MME, a respective weight factor for each of the one or more different types of UE or UE traffic to be serviced by the MME.

The present invention also provides a Mobility Management Entity, MME, for use in an overlay network, the MME comprising: means for receiving configuration data defining one or more types of user equipment, UE, or types of UE traffic to be serviced by the MME; and means for sending a base station with which the MME is to be associated a message that includes configuration data that identifies the one or more types of UE or UE traffic to be serviced by the MME.

In one embodiment, the means for receiving configuration data is arranged to receive reconfiguration data that defines one or more other types of UE or UE traffic to be serviced by the MME and wherein the means for sending is arranged to send the reconfiguration data to the base station.

The configuration or reconfiguration data may assign one or more MME types to the MME, each MME type defining a type of UE or UE traffic that the MME is configured to serve. The configuration data may comprise one or more weight factors for the MME, each weight factor indicating a processing power of the MME in respect of a type of UE or UE traffic to be serviced by the MME. In this case, if the MME configuration data is changed to assign the MME to serve another type of UE or UE traffic, then the configuration data includes one or more modified weight factors associated with the MME.

The MME may be arranged to include said configuration data in an S1 setup message or in an MME configuration update message that is sent to the base station.

In one embodiment, the MME receives a UE attach request forwarded from said base station, performs a location update procedure for the UE with a Home Subscriber Server, HSS, receives subscription data for the UE from the HSS, and compares the UE subscription data with the configuration data to determine if the MME is configured to service the type of UE defined by said subscription data. If the MME determines that the MME is not configured to service the UE, the MME may send the base station a reroute command to cause the base station to send the UE attach request to another MME. In this case, the MME may include subscription data for the UE in the re-route command to allow the base station to identify an MME that can service the UE.

The present invention also provides a base station that is arranged to wirelessly communicate with a plurality of user equipment, UE, and with a plurality of Mobility Management Entities, MMEs, configured in overlay networks, the base station comprising: means for receiving, from each MME, respective configuration data for the MME, the configuration data for an MME defining one or more types of UE or UE traffic to be serviced by the MME; means for receiving a request from a UE; means for selecting an MME to service the request in dependence upon a type of UE or UE traffic associated with the UE and the received MME configuration data; and means for forwarding the request to the selected MME.

In one embodiment, the means for receiving configuration data receives reconfiguration data that defines one or more other types of UE or UE traffic to be serviced by an MME. The configuration or reconfiguration data for an MME may assign one or more MME types to the MME, each MME type defining a type of UE or UE traffic that the MME is configured to serve. The configuration data for an MME may comprise one or more weight factors for the MME, each weight factor indicating a processing power of the MME in respect of a type of UE or UE traffic to be serviced by the MME. In this case, if the configuration data for an MME is changed, in order to assign the MME to serve another type of UE or UE traffic, then the configuration data includes one or more modified weight factors associated with the MME.

The base station may receive said configuration data in an S1 setup message or in an MME configuration update message.

In one embodiment, the base station receives a UE attach request from a UE and forwards the UE attach request to an MME, wherein in response to receiving a reroute command from the MME, is arranged to use UE subscription data provided in the reroute command and stored MME configuration data to reroute the UE attach request to another MME that can service the UE attach request.

If the base station identifies, from the MME configuration data, multiple MMEs that can service a UE request, the means for selecting an MME may be arranged to select the MME in dependence upon weight factors associated with the multiple MMEs that can service the UE request.

The present invention also provides a communication system comprising the above described control node, a plurality of the above described MMEs, at least one of the above described base stations and one or more user equipment, UE, for sending UE requests to the base station for servicing by a selected one of the MMEs, selected by the base station using MME configuration data and UE data identifying a type of UE or a type of traffic associated with the UE.

Aspects of the invention extend to corresponding methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently, or in combination, with any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described, by way of example, with reference to the accompanying drawings:

FIG. 9A illustrates the way in which MMEs may be grouped into two groups and illustrating the way in which one or more MMEs may be reconfigured to address loading issues within the overlay network;

FIG. 9B illustrates the way in which MMEs may be grouped into two groups and illustrating the way in which one or more MMEs may be reconfigured to address loading issues within the overlay network and in which a weight factor for a reconfigured MME is also changed; and FIG. 10 illustrates the way in which MMEs may be grouped into two groups and illustrating the way each MME is assigned different weight factors, each associated with a different UE traffic type and illustrating the way in which a type of an MME can be reconfigured by changing the weight factors associated therewith.

DESCRIPTION OF EMBODIMENTS

Overview

Figure 1:
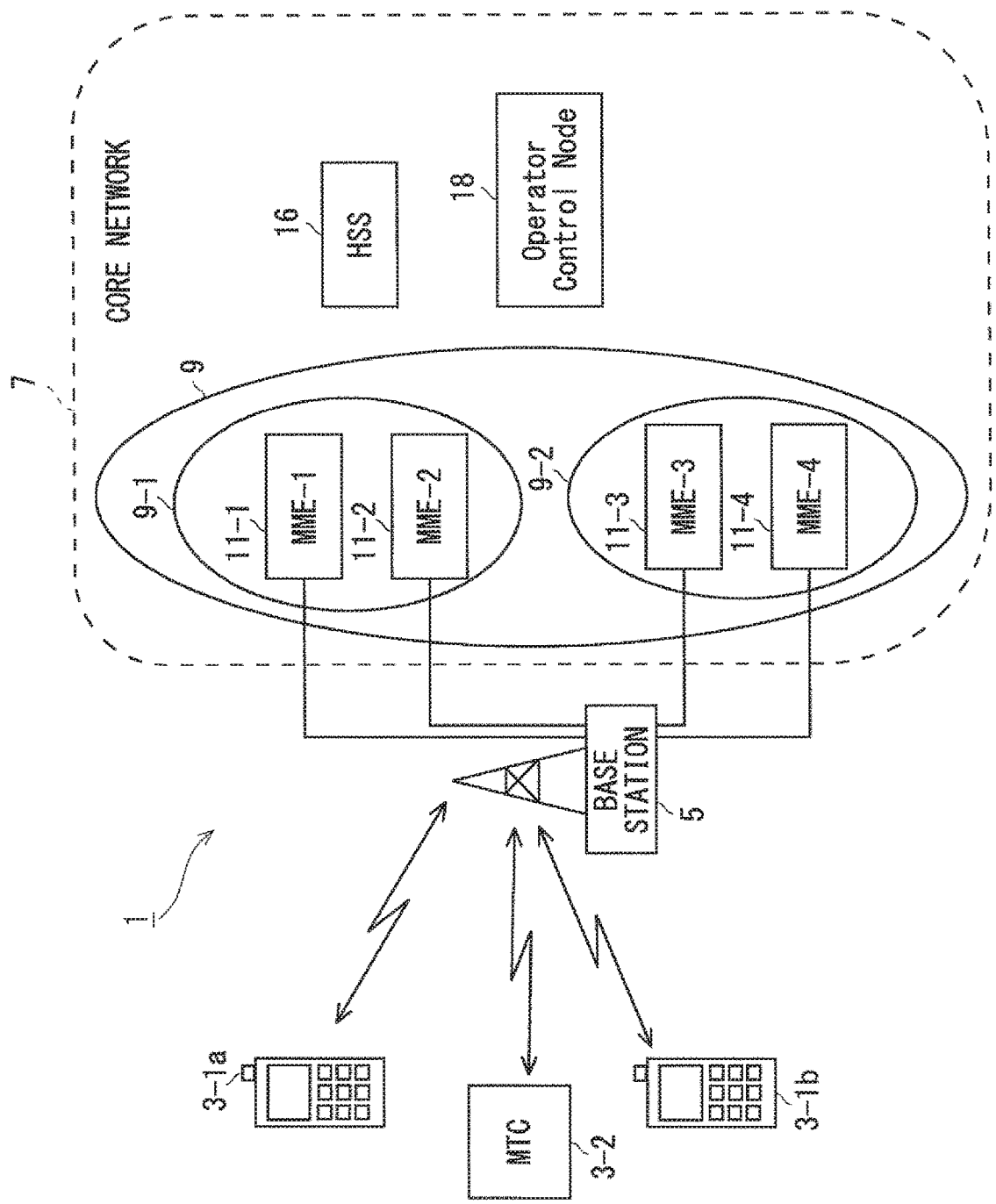
FIG. 1 illustrates schematically a cellular communication system to which embodiments of the invention may be applied.

FIG. 1 schematically illustrates a communication network 1 in which user equipment (UE) in this example conventional user communication devices 3-1a and 3-1b and machine type communication (MTC) device 3-2 can communicate with other devices via an E-UTRAN base station 5 and a core network 7. As those skilled in the art will appreciate, two user communication devices 3-1, one MTC communication device 3-2 and one base station 5 are shown in FIG. 1 for illustration purposes, additional UEs and/or base stations are likely to be present in a deployed system.

The base station 5 is coupled to a core network 7 and the core network 7 is also coupled to other networks (e.g. the Internet) via one or more gateways (not shown). The interface between the base station 5 and elements of the core network 7 might utilise, for example, a high speed, high bandwidth communication link, such as an optical fiber link or the like. The core network 7 includes, amongst other things, a pool 9 of mobility management entities (MMEs) 11, a Home Subscriber Server (HSS) 16 and an operator control node 18. In this illustration, the pool 9 of MMEs has four MMEs, 11-1 to 11-4. The MMEs 11 manage general mobility aspects of the UEs 3 and ensure that connectivity is maintained with the UEs 3 as they move within the geographical area covered by the communication system (and/or as they are handed over between base stations of the communication system). The MMEs 11 also manage the various bearers associated with the UEs 3 (e.g. such as an EPS bearer and/or an MBMS bearer) by controlling the other network nodes via which such bearers are provided. The MMEs 11 are also responsible for ensuring that the UEs 3 receive an appropriate level of service (e.g. a desired bit rate) in accordance with their respective subscription.

The HSS 16 maintains subscription specific information (e.g. subscribed services (which might define that the UE is subscribed to an MTC network or a conventional network etc.), associated service parameters, device capabilities, and/or the like) for each UE 3. The HSS 16 provides such stored information to other network nodes (e.g. the MMEs 11) as needed.

Figure 2A:
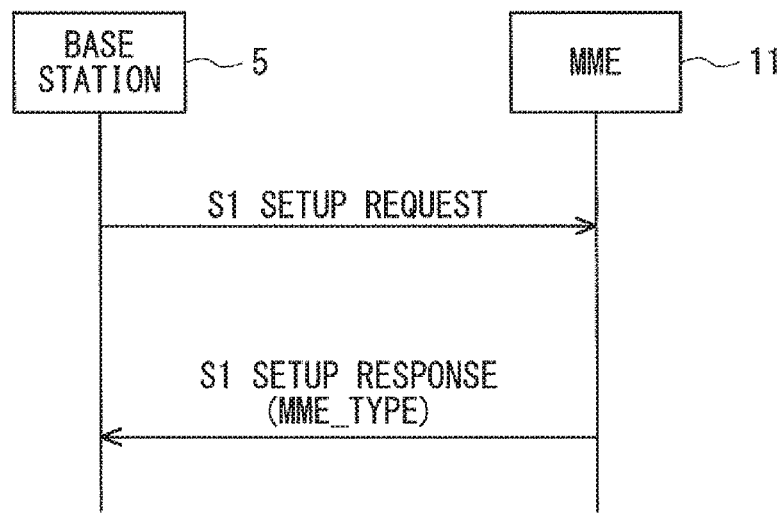
FIG. 2A is a timing diagram illustrating the way in which MME type data can be sent from an MME to a base station forming part of the system shown in FIG. 1, during an initial setup procedure.

In this embodiment, the MMEs 11 in the pool 9 are arranged in separate groups, with the MMEs in each group being configured to service a particular type of UE traffic (for example conventional UE traffic, MTC UE traffic, SDT (small data transmission) traffic, roaming traffic etc.)—and in this way the operator core network 7 is operating overlay networks specialised for different types of UE 3. For ease of illustration two groups 9-1 and 9-2 of MMEs are illustrated in FIG. 1, with the MMEs in the first group 9-1 (MMEs 11-1 and 11-2) being configured to serve conventional UEs 3-1 and with the MMEs in the second group 9-2 (MMEs 11-3 and 11-4) being configured to serve MTC type UEs 3-2. The operator control node 18 is responsible for configuring the MMEs 11 into the different groups. When the MME 11 first connects with the base station 5, the MME 11 informs the base station of its MME type. As illustrated in FIG. 2A, this MME type information may be provided to the base station 5 within a new Information Element (IE) (MME_TYPE) of the existing S1 setup message (which is defined in TS 36.413, Section 9.1.8.5) or in any other message transmitted over the S1 interface from the MME 11 to the base station 5. The base station 5 stores this MME type information for each of the MMEs 11 with which it has a connection, so that the base station 5 can use the stored MME type information to select an appropriate MME 11 for a given UE 3.

Figure 2B:
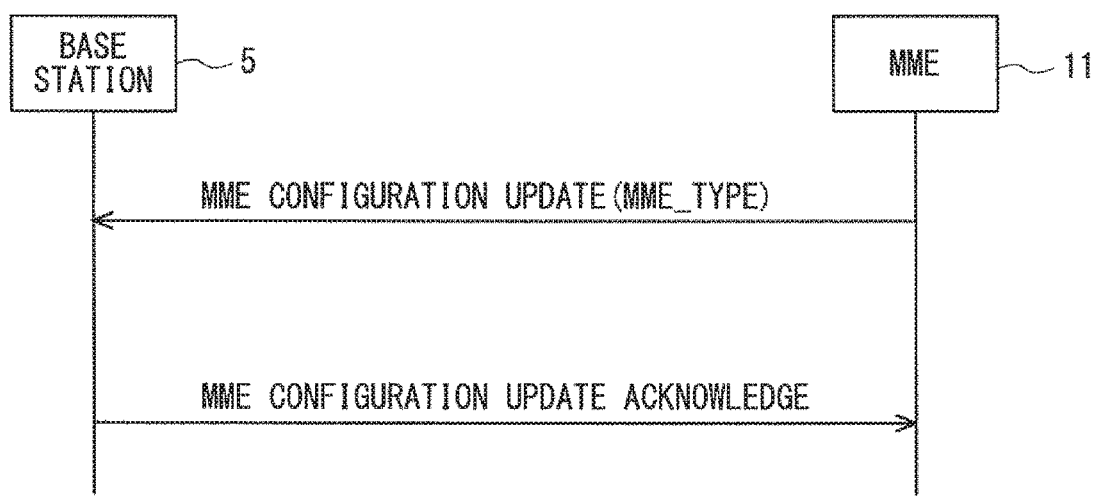
FIG. 2B is a timing diagram illustrating the way in which MME type data can be sent from an MME to a base station forming part of the system shown in FIG. 1, during a subsequent configuration update procedure.

In this embodiment, the operator control node 18 monitors the network traffic from the different types of UEs 3 and can dynamically re-configure the MMEs 11—to change the groups in which they belong, in order to make efficient use of the network resources (in this case the MMEs 11). For example, if at a given point in time the operator control node 18 detects that there is a surge of traffic from MTC type UEs 3-2 that are connected with the base station 5, then it can, for example, re-configure MME 11-2 to serve MTC type UEs 3-2 instead of (or in addition to) conventional UEs 3-1. When this happens, the reconfigured MME 11-2 informs the base station 5 of its reconfiguration, for example, as illustrated in FIG. 2B, using a new Information Element IE (MME_TYPE) in the existing MME Configuration Update message (which is defined in TS 36.413, Section 8.7.5) or within any other message transmitted over the S1 interface from the MME 11-2 to the base station 5. The base station 5 stores the new MME type for the re-configured MME 11-2 and accordingly will allocate MTC type UEs to that reconfigured MME 11-2. This will therefore make available additional network resources (MME resources) for dealing with the changing network conditions.

As indicated above, the re-configuration may not replace the original MME type—it may simply define that the MME 11-2 can handle MTC UEs 3-2 as well as conventional UEs 3-1. In this case, the base station 5 can assign both types of UE 3 to the same MME 11.

With regard to how the base station 5 chooses which MME 11 within a particular group 9 to assign to a particular UE, the 3GPP standards already define MME load balancing mechanisms when multiple MMEs are available. In particular, in accordance with the current load balancing mechanisms, each MME 11 within a pool is provided with a weight factor (WF) that depends on its processing power compared to the other MMEs in the same pool 9. The MME 11 transmits its weight factor to the base station 5 when it establishes a connection with the base station 5. Thus if MME 11-1 has twice the processing power of MME 11-2, then its weight factor will be twice the weight factor for MME 11-2; and so using the weight factors, the base station 5 will cause twice as many UEs to be passed to MME 11-1 than to MME 11-2. Or if MME 11-1 has the same processing power as MME 11-2, then they will have the same weight factor and so the base station 5 will assign the UEs to the two MMEs 11-1 and 11-2 in equal proportions. As will be described in more detail below, the same weight factor load balancing mechanism can be used for the MMEs in each group 9-1 and 9-2 or a modified weight factor mechanism can be used to increase further the efficient use of the network resources in overlay network deployments.

Before describing the operation of the invention in further detail, a brief description will now be given of the different components of the system shown in FIG. 1.

User Equipment

Figure 3:
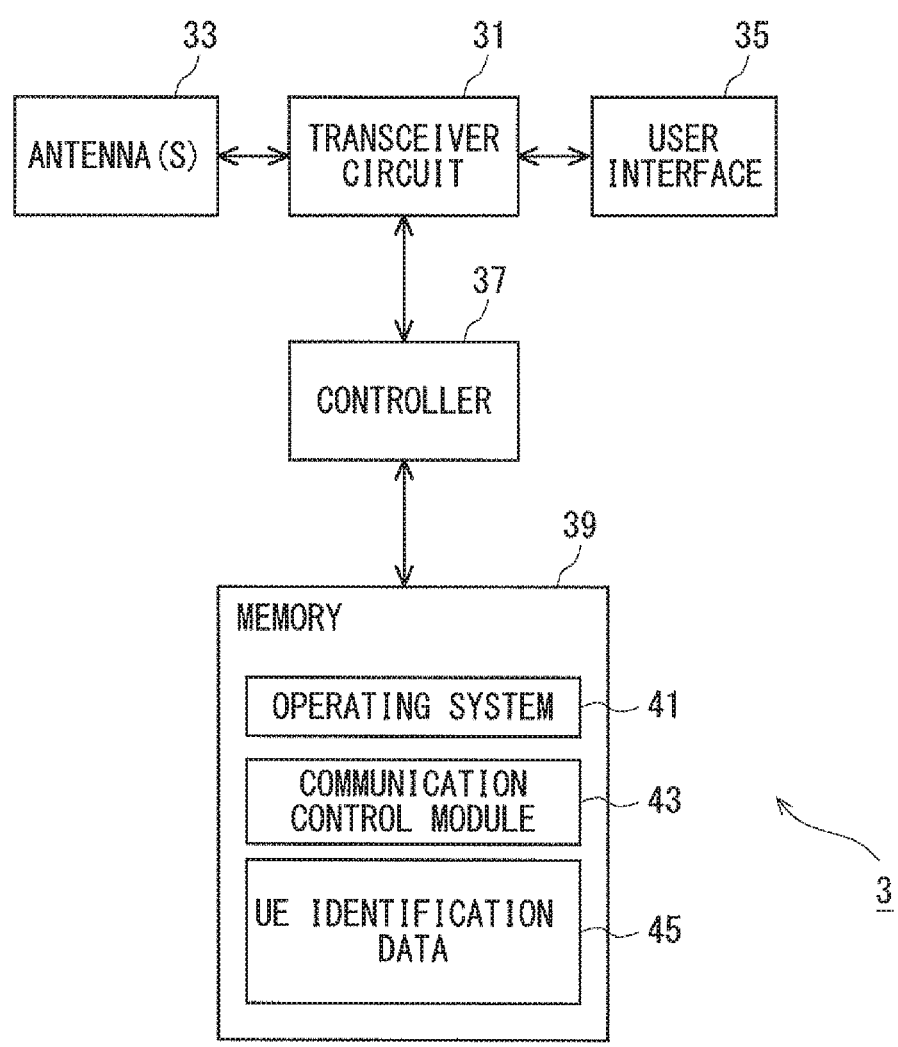
FIG. 3 is a functional block diagram illustrating some of the functionality of a UE forming part of the system shown in FIG. 1.

FIG. 3 is a functional block diagram illustrating some of the functionality of a UE 3 shown in FIG. 1. As shown, the UE 3 has a transceiver circuit 31 that is operable to transmit signals to and to receive signals from a base station 5 via one or more antenna 33. The UE 3 has a controller 37 to control the operation of the UE 3, which is controlled, in this embodiment, by software running in memory 39. For user communication device type UEs 3-1, the UE will have all the usual functionality of a conventional user communication device (such as a user interface 35). For MTC type UEs 3-2, no user interface may be needed. The software running in memory 39 may be pre-installed in the memory 39 and/or may be downloaded via the communication network or from a removable data storage device (RMD), for example.

As shown in FIG. 3, these software instructions include, among other things, an operating system 41 and a communication control module 43. The memory also stores other UE identification data 45 that identifies the UE 3 to the core network 7.

The communication control module 43 handles (e.g. generates, sends and receives) control signals for controlling the connections between the UE 3 and other user communication devices, such as the base station 5. When establishing a connection with the base station 5, the communication control module 43 sends the UE identification data 45 to the base station 5. This information allows the base station 5 to identify the type of UE and to select an appropriate MME 11 from the pool 9 of MMEs coupled to the base station 5.

Base Station

Figure 4:
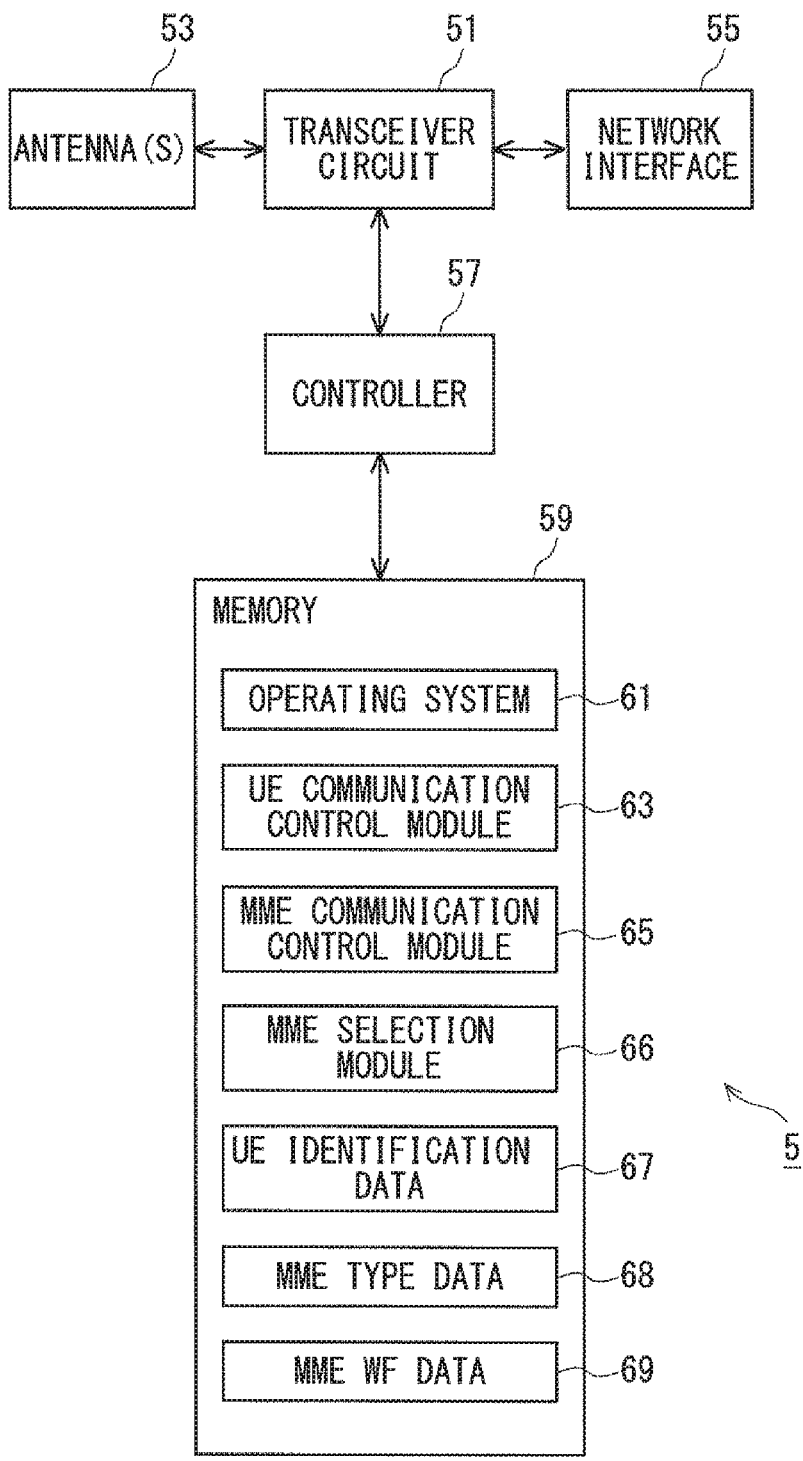
FIG. 4 is a functional block diagram illustrating some of the functionality of a base station forming part of the system shown in FIG. 1.

FIG. 4 is a functional block diagram illustrating some of the functionality of the base station 5 shown in FIG. 1. As shown, the base station 5 has a transceiver circuit 51 that is operable to transmit signals to and to receive signals from UEs 3 via one or more antenna 53 and that is operable to transmit signals to and to receive signals from nodes within the core network 7 via the network interface 55. The base station 5 has a controller 57 to control the operation of the base station 5. The controller 57 is associated with a memory 59 and is coupled to the transceiver circuit 51. Software may be pre-installed in the memory 59 and/or may be downloaded via the communication network or from a removable data storage device (RMD), for example.

The controller 57 is configured to control the overall operation of the base station 5 by, in this example, program instructions or software instructions stored within the memory 59. As shown, these software instructions include, among other things, an operating system 61, a UE communication control module 63, an MME communication control module 65 and an MME selection module 66. The memory 59 is also used to store UE identification data 67, MME type data 68 and MME WF (Weight Factor) data 69 received from the UEs/MMEs.

The UE communication control module 63 handles (e.g. generates, sends and receives) control signals for controlling the connections between the base station 5 and the UEs 3. Similarly, the MME communication control module 65 handles (e.g. generates, sends and receives) control signals for controlling the connections between the base station 5 and the MMEs 11.

The MME selection module 66 selects an MME 11 to service a given UE 3 using the UE identification data for the UE 3, the MME type data 68 and the MME WF data 69 stored in memory 59. In some embodiments, the MME selection module 66 can determine the type of UE 3 directly from the corresponding UE identification data received from the UE 3. In other embodiments, the base station 5 needs to use the UE identification data received from the UE 3 to retrieve data indicating the type of UE from user profile data stored in the HSS 16.

Mobility Management Entity

Figure 5:
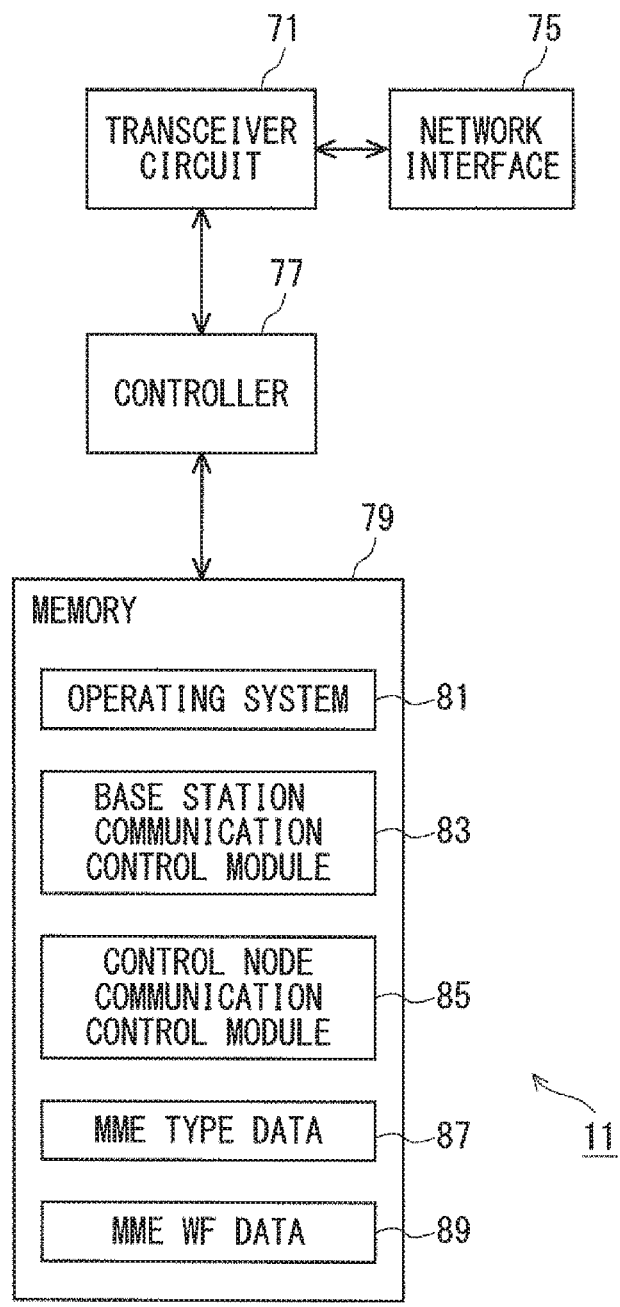
FIG. 5 is a functional block diagram illustrating some of the functionality of a Mobility Management Entity (MME) forming part of the system shown in FIG. 1.

FIG. 5 is a functional block diagram illustrating some of the functionality of each of the Mobility Management Entities 11 shown in FIG. 1. As shown, the MME 11 has a transceiver circuit 71 that is operable to transmit signals to and to receive signals from other communication nodes (such as the base station 5 and the operator control node 18) via a network interface 75. The MME 11 has a controller 77 to control the operation of the MME 11. The controller 77 is associated with a memory 79 and is coupled to the transceiver circuit 71. Software may be pre-installed in the memory 79 and/or may be downloaded via the communication network or from a removable data storage device (RMD), for example.

The controller 77 is configured to control the overall operation of the MME 11 by, in this example, program instructions or software instructions stored within the memory 79. As shown, these software instructions include, among other things, an operating system 81, a base station communication control module 83, and an operator control node communication control module 85. The memory 79 also stores currently configured MME type data 87 and MME WF data 89.

The base station communication control module 83 handles (e.g. generates, sends and receives) control signals for controlling the communications between the MME 11 and the base station 5. Similarly, the control node communication control module 85 handles (e.g. generates, sends and receives) control signals for controlling the communications between the MME 11 and the operator control node 18. When new MME type data 87 or new MME WF data 89 is received from the operator control node 18, this data is stored in memory 79 and the base station communication control module 83 generates an appropriate MME configuration update message (or other base station control message) for sending to the base station 5 which includes the new MME type data 87 and/or the new MME WF data 89.

Operator Control Node

Figure 6:
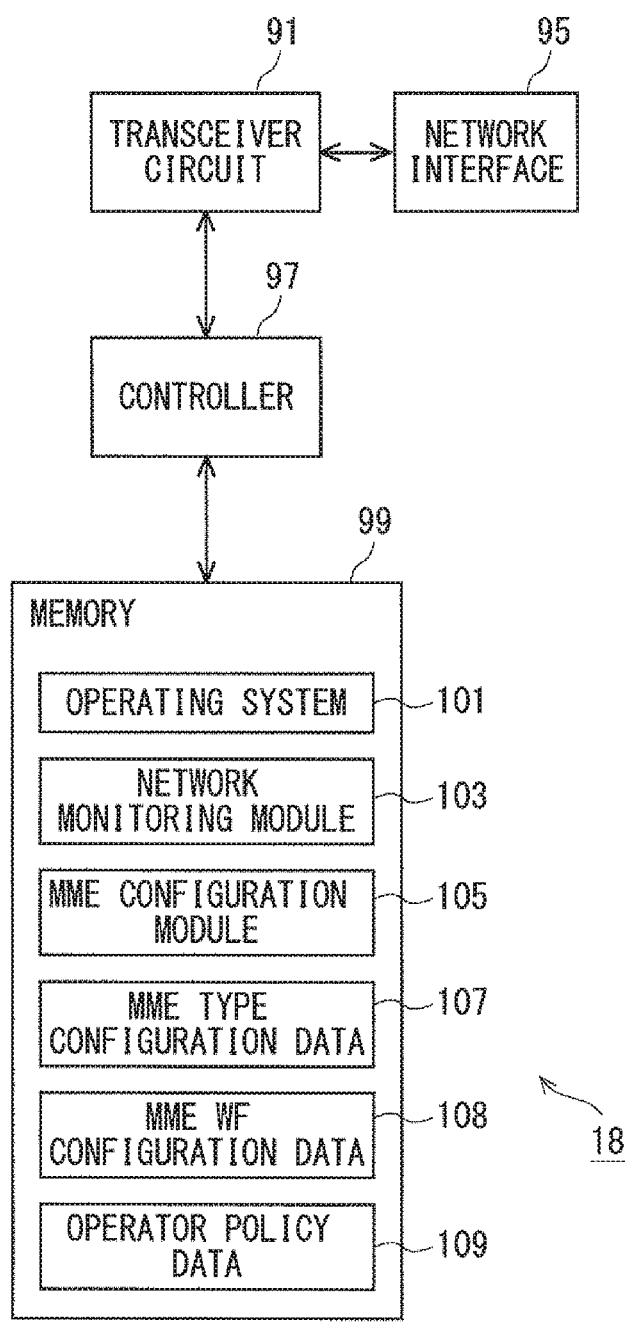
FIG. 6 is a functional block diagram illustrating some of the functionality of an operator control node forming part of the system shown in FIG. 1.

FIG. 6 is a functional block diagram illustrating some of the functionality of the operator control node 18 forming part of the system 1 shown in FIG. 1. This operator control node may provide the specific functionality described herein or it may form part of a more general Operations and Maintenance (O&M) control node. As shown, the operator control node 18 has a transceiver circuit 91 that is operable to transmit signals to and to receive signals from other network nodes (such as the base station 5 and the MMEs 11) via a network interface 95. The operator control node 18 has a controller 97 to control the operation of the operator control node 18. The controller 97 is associated with a memory 99 and is coupled to the transceiver circuit 91. Software may be pre-installed in the memory 99 and/or may be downloaded via the communication network or from a removable data storage device (RMD), for example.

The controller 97 is configured to control the overall operation of the operator control node 18 by, in this example, program instructions or software instructions stored within the memory 99. As shown, these software instructions include, among other things, an operating system 101, a network monitoring module 103, and an MME configuration module 105. The memory 99 also holds MME type configuration data 107 that defines the current configuration of the MMEs 11 in terms of the type of UEs they each are configured to service; and MME WF configuration data 108 that defines the currently configured weight factors for the MMEs 11. The memory 99 also holds operator policy data 109 that defines the way in which the operator control node 18 should configure the MMEs 11 to meet the policy requirements of the network operator for a given network condition (loading). This operator policy data 109 might define, for example, the loading limits on individual MMEs 11 before reconfiguration is required etc.

The network monitoring module 103 is responsible for monitoring traffic and general loading within the operator network (base stations 5, MMEs 11 etc). Based on the monitored network conditions, the MME configuration module 105 may reconfigure one or more of the MMEs 11. For example, in the scenario discussed above, if the network monitoring module 103 detects an increase in MTC UEs, then the MME configuration module 105 may reconfigure one or more of the MMEs 11 that are currently servicing only conventional UEs 3-1 to also service (or to instead only service) MTC type UEs 3-2. The MME configuration module 105 may also change the weight factor for one or more of the MMEs 11, again to control the loading on one or more of the MMEs 11. If an MME 11 is to be reconfigured, the MME configuration module 105 sends the MME 11 to be reconfigured a configuration update message that includes the new MME type data or the new MME WF data.

In the above description, the user communication device 3, the base station 5, the mobility management entity 11, and the operator control node 18 are described for ease of understanding as having a number of discrete modules (such as the communications control modules, the monitoring module, the reconfiguration module etc.). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Operation

A description of the operation of this embodiment will now be described with reference to FIG. 7 which shows a timing diagram illustrating a sequence of numbered steps that may be performed in an exemplary operation in the present embodiment.

In step 1, the MME 11-1 transmits an MME configuration update message to the base station 5. This configuration update message contains an MME type IE that designates that MME 11-1 is specialised for handling conventional UEs 3-1.

In step 2, the MME 11-3 transmits an MME configuration update message to the base station 5. This configuration update message contains an MME type IE that designates that MME 11-3 is specialised for handling MTC type UEs 3-2.

Steps 3 and 4 show that signalling from conventional UEs 3-1 are directed, by the base station 5 (in accordance with the stored MME type information and the type of UE from which the signalling is received) towards MME 11-1 and steps 5 and 6 show that signalling from MTC UEs 3-2 are directed (in accordance with the stored MME type information and the type of UE from which the signalling is received) towards MME 11-3. If necessary, the base station 5 will identify the type of UE from UE subscription information held in the HSS 16 using identification information provided by the UE 3.

Figure 7:
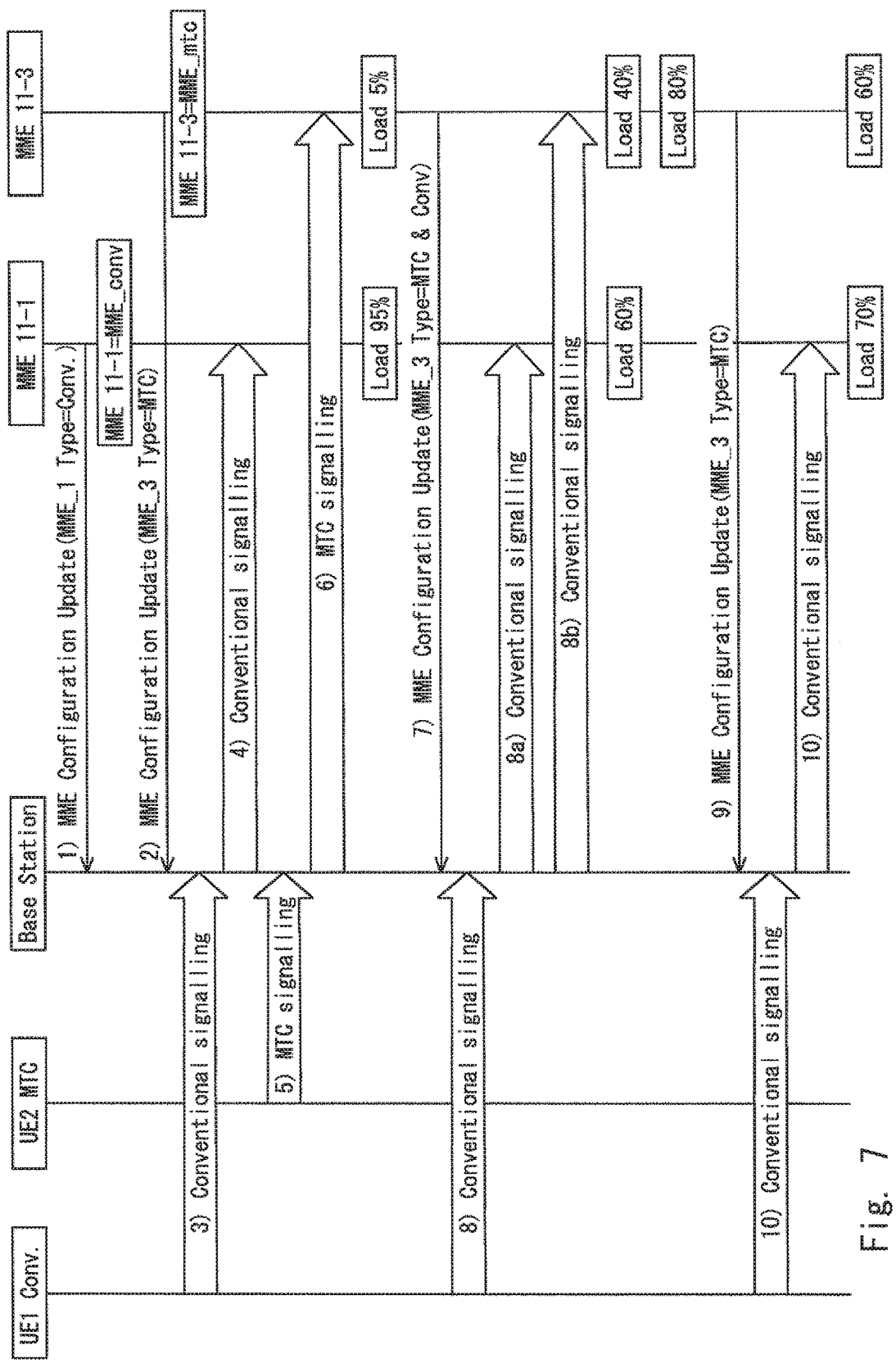
FIG. 7 is a timing diagram illustrating an exemplary way in which the system shown in FIG. 1 can operate to allow for efficient use of the network resources shown in FIG. 1.

For simplicity, FIG. 7 does not show configuration of MMEs 11-2 and 11-4. Where multiple MMEs of the same type are coupled to the base station (as in the system illustrated in FIG. 1), the base station 5 uses the weight factors associated with the MMEs 11 in each group 9 for load balancing during the MME selection process (as defined in TS23.401).

In this illustration, at some point after this initial configuration, the load on MME 11-1 becomes unacceptably high (above a certain threshold, e.g. 95%) whereas the load on MME 11-3 is quite low (e.g. 5%). The operator control node 18 detects this situation and decides to take corrective action in accordance with its stored operator policy data 109. In this case, it reconfigures the MME11-3 so that it will handle communications relating to conventional and MTC UEs 3. The actions of the operator control node 18 are not illustrated in FIG. 7 to avoid over complicating the Figure. Once the MME 11-3 has been reconfigured by the operator control node 18, the MME 11-3 sends the base station, in step 7, an MME configuration update message including an MME type indicating that MME 11-3 is designated to handle conventional UE traffic and MTC UE traffic. Upon receipt of this configuration update message, the base station 5 updates its stored MME type data 68 for MME 11-3. Thereafter the base station 5 will use both MME 11-1 and MME 11-3 for handling conventional UEs 3-1 (as shown in steps 8a and 8b). This leads to a reduction of the load on MME 11-1, as shown in FIG. 7.

If at a later point in time, the loading on MME 11-3 exceeds a defined threshold (in this example 80%) and the MME 11-1 has some available spare capacity, then the operator control node 18 reconfigures MME 11-3 to handle MTC UEs 3-2 only. In this case, once reconfigured, the MME 11-3 sends, in step 10, another configuration update message to the base station 5 informing the base station 5 that it is now an MTC only type of MME 11. Accordingly, the base station 5 will update its stored MME type data 68 for MME 11-3 and as a result, subsequently received conventional signalling (in step 10) is passed to MME 11-1 and not to MME 11-3. This will therefore reduce the loading on MME 11-3 as illustrated.

As discussed above, if the base station 5 is unable to determine directly the type of UE 3 from the information received from the UE 3 when the request is received, the base station 5 will use UE identification data that is received to determine the service to which the UE has subscribed from the subscription data stored in the HSS for that UE. This subscription data will inform the base station 5, for example, if the UE 3 has subscribed to an MTC service or a conventional service etc. The way in which this information is obtained in an example operation is illustrated in FIG. 8.

Figure 8:
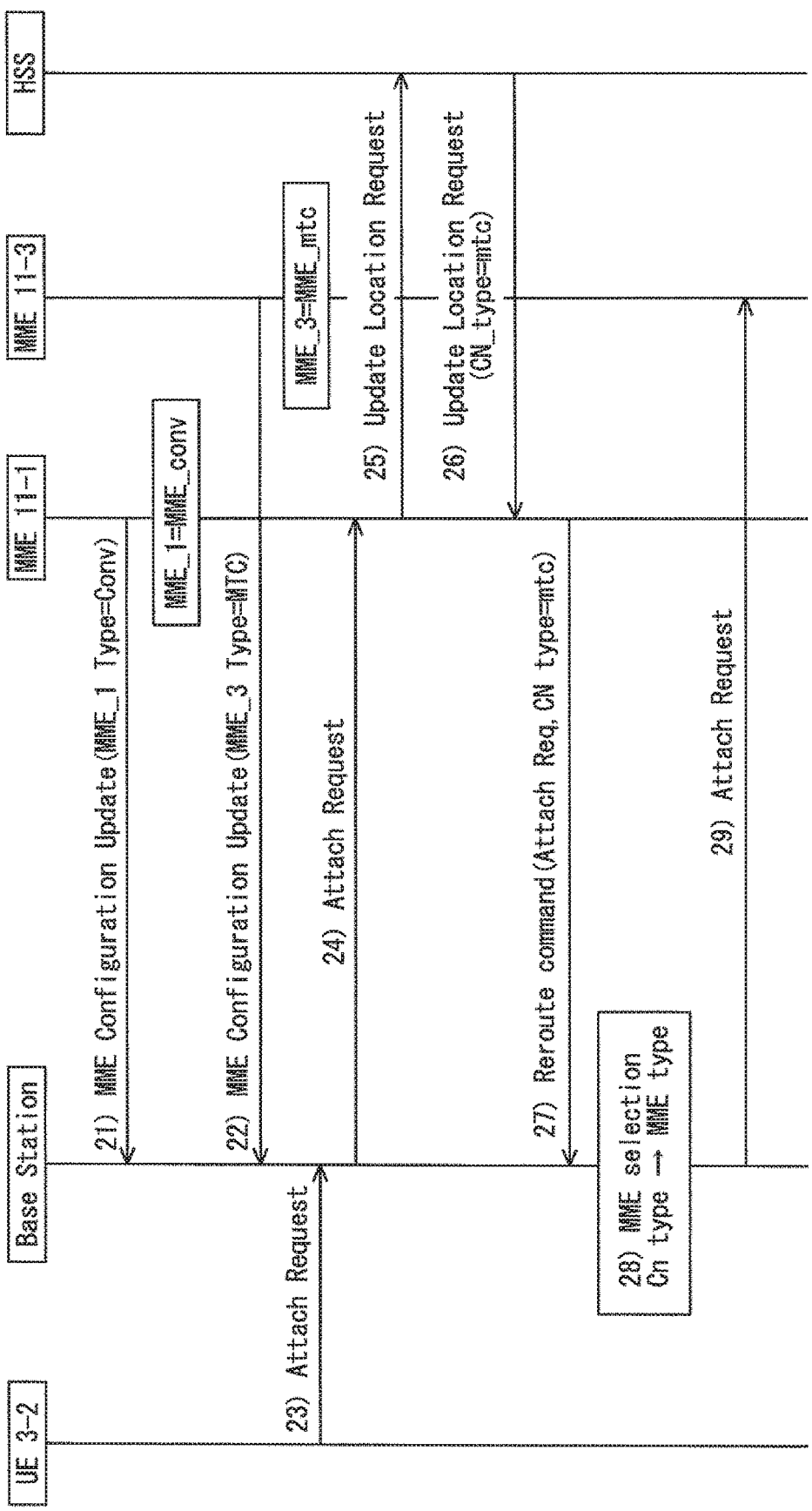
FIG. 8 is a timing diagram illustrating the way in which the base station may determine the type of UE from subscription information stored in the HSS forming part of the system shown in FIG. 1.

As shown in FIG. 8, in step 21, MMEs 11-1 is configured to serve conventional UEs 3-1 and in step 22, MME 11-3 is configured to serve MTC UEs 3-2. At step 23, a UE 3-2 with a subscription for the MTC overlay network initiates an attachment to the base station 5 by sending an attach request message. In this embodiment, this attach request message does not include any data that allows the base station 5 to determine directly what service the UE has subscribed to, and therefore, the base station 5 selects a default MME (in this case MME 11-1) and forwards the attach request message to it.

In steps 25 and 26, MME 11-1 accesses the HSS 16 in accordance with the normal attach procedure and along with providing the usual location update for the UE 3-2, retrieves the UE's subscribed network (e.g. core network (CN) type) information from the HSS. The MME 11-1 compares the received CN type with its own currently defined MME type data 87 and in this case the types do not match. Therefore, MME 11-1 identifies that the UE Attach Request must be re-routed to another MME 11; and so the MME 11-1 sends, in step 27, the base station 5 a re-route command that includes the CN type information retrieved from the HSS 16 for the UE 3-2 that sent the attach request. In step 28, the base station 5 uses the CN type information in the received re-route command to find an appropriate MME 11 to which the attach message should be forwarded (by comparing the received CN type data with the MME type data 68 that it has stored in its memory 59 and identifying a match). In this case, the identified MME is MME 11-3 and so, in step 29, the base station 5 forwards the attach request message to the selected MME 11-3 that is configured to serve MTC UEs 3-2.

MME Type & MME WF

The provision of this new MME type information impacts on the effect of the existing MME weight factor that is used for load balancing between MMEs (in a single network—rather than in overlay networks). The way in which this new MME type impacts the existing load balancing will now be explained with reference to FIG. 9A which considers an example system with the base station 5 being connected to four MMEs 11 of an MME Pool. Initially, (as illustrated in the left hand side of FIG. 9A) two MMEs 11 are designated for MTC traffic (in this example MMEs 11-1 and 11-2) and two MMEs 11 are designated for conventional traffic (in this example MMEs 11-3 and 11-4). For load balancing purposes each MME 11 is assigned a weight factor (WF) that indicates the relative processing capacity of that MME 11 with respect to the other MMEs in the pool (in accordance with TS36.413, section 9.2.3.17). Thus in the scenario illustrated in FIG. 9A, MMEs 11-1, 11-2 and 11-3 are of the same capacity (WF=50) whereas MME 11-4 has twice the capacity (WF=100). Therefore, based on these weight factors, the base station 5 will balance the traffic in the following way:

MTC type traffic is balanced between MME 11-1 and MME 11-2 (in equal proportions);

Conventional type traffic is balanced between MME 11-3 and MME 11-4 (with twice as much traffic being directed towards MME 11-4 than to MME 11-3).

If, because of overloading on the conventional MMEs 11-3 and 11-4, the operator control node 18 decides to provide more processing power for conventional traffic, it may make, for example, MME 11-2 available for both types of traffic (MTC and conventional)—as illustrated in the right hand side of FIG. 9A. In this case, however, the weight factors remain the same, and therefore, the base station 5 will balance the traffic in the following way:

MTC type traffic is balanced between MME 11-1 and MME 11-2 (in equal proportions);

Conventional traffic is now balanced between MME 11-2, MME 11-3 and MME 11-4 (with twice as much traffic being directed towards MME 11-4 than to MME 11-2 or to MME11-3).

Thus, in this scenario the same weight factor of MME 11-2 is used by the base station 5 to control the amount of both types of traffic that is passed to MME 11-2. This may lead to an overloading of the MME 11-2. One way to reduce this problem is to change the WF for any MME 11 that is reconfigured to provide service to multiple types of UE traffic. For example, in the above illustration, the operator control node 18 may also decide (at the same time as it changes the MME type of MME 11-2 to conventional and MTC) to reduce the weight factor associated with MME 11-2—for example to a weight factor of 25. This will mean that MME 11-2 will have the same overall traffic limit as before—but for the two different traffic types. This scenario is illustrated in FIG. 9B. In particular, with this arrangement, the base station 5 will balance the traffic in the following way:

The MTC type traffic is balanced between MME 11-1 and MME 11-2 (with twice as much traffic going to MME 11-1 than to MME 11-2);

The conventional traffic is now balanced between MME 11-2, MME 11-3 and MME 11-4 (with twice as much traffic being directed towards MME 11-4 than to MME 11-3 and with twice as much traffic being directed towards MME11-3 than to MME 11-2). In this way, MME 11-1 will receive two thirds of all MTC traffic; MME 11-2 will receive a third of all MTC traffic and one seventh of all conventional traffic; MME 11-3 will receive two sevenths of all conventional traffic; and MME 11-4 will receive four sevenths of all conventional traffic. This should reduce the likelihood of MME 11-2 quickly becoming overloaded because of the change of MME type.

The way in which the operator control node 18 changes the MME types and changes any weight factors (to increase or decrease them depending on the loads to the MMEs in the MME Pool 9) depends on the operator policy data 109—which will be specific to each network operator.

An alternative, but more flexible, solution to the interaction between the MME type and the MME WF is to provide a different weight factor for each type of traffic that an MME 11 is configured to serve. Thus each MME 11 would be assigned multiple MME weight factors—a weight factor per MME Type (per traffic type). For example, an MME 11 that is of MTC and Conventional type would have two different weight factors—an mtc_weight_factor and a conv_weight_factor. This would allow more flexibility for the operator in scheduling the traffic towards the MMEs of mixed type which would allow for better load balancing across the overlay networks. Such a scenario is illustrated in FIG. 10. In FIG. 10, initially (as shown in the left hand side of FIG. 10) MME 11-1 and MME 11-2 are of type MTC with mtc_wf=50 and conv_wf=0 (no conventional traffic served by MME 11-1 and MME 11-2). MME 11-3 is of conventional type with mtc_wf=0 and conv_wf=50 whereas MME 11-4 is also of conventional type but has twice the power of the other MMEs in the MME Pool—and so it has mtc_wf=0 and conv_wf=100.

In this case, if the operator decides to allow more processing power for conventional traffic, it may make, for example, MME 11-2 available for both types of traffic by modifying the MME weight factors to mtc_wf=25 and conv_wf=25, for MME 11-2. In this case the operator can set a desired relation between the weight factors of the same MME 11 for better overload control across the different types of networks (or network nodes) within the overlay networks. For example, instead of making the weight factors for MTC and conventional traffic the same, the operator control node 18 may instead modify the MME weight factors for MME 11-2 to mtc_wf=10 and conv_wf=40—which will increase the amount of conventional traffic sent to MME 11-2. Again, the operator control node 18 may increase or reduce the different weight factors based on the specific operator's policy for overload control. Indeed, with this alternative embodiment, the different values assigned to the different weight factors of each MME will effectively assign the different MMEs to different types of traffic; and there is no need, in this alternative embodiment, for the MMEs 11 to send the base station 5 separate MME type data 68—as it is defined already by the presence or absence and/or the values of all the weight factors associated with the MME 11. An MME that is specialised for a specific type of UE will only have the weight factor corresponding to that traffic type set at a value that is not equal to zero—any other weight factors associated with that MME will be zero (in this case only one weight factor may be used for a specialised MME).

Advantages

The systems described above offer a number of advantages. In particular, the main embodiment described above allows for a flexible and dynamic MME Type configuration and selection in overlay networks and for load balancing between the overlay networks. A network operator (the control node 18) can, at any point of time (based on the current network load, traffic pattern, emergencies and maintenance events or any other potential use case that could lead to overload to one or more networks within the overlay networks architecture), re-configure the specialisation of the MMEs (via the new information element (MME Type)) and change also their weight factor (decrease or increase) so that the overload of certain network(s) within the overlay networks is avoided.

The alternative embodiment described above with reference to FIG. 10 allows for different weight factors per MME Type which leads to a more flexible and sophisticated load balancing across the overlay networks and within each overlay network. It allows for proportional load balancing between the constituent overlay networks and MMEs 11.

In brief the embodiments allow for dynamic and optimised overload control within each overlay network and across all the overlay networks.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, the MMEs were divided into two groups of MMEs—one for servicing conventional UEs and one for servicing MTC UEs. As those skilled in the art will appreciate, the available MMEs may be divided into many more groups, depending on the number of different types of UEs defined within the particular operator network.

In the above embodiments, the communication devices, such as the base stations, the UEs and the MMEs used 3GPP LTE communication technology. However, it will be appreciated that other communication technologies may be used instead.

In the above embodiments, the user equipment comprises mobile (cellular) communication devices or machine type communication devices. Other types of UE can be defined, such as roaming UEs, SDT UEs etc., and a different overlay network may be provided for handling each type of UE.

In the above description, the UEs, the base station, the mobility management entity, and the control node are described for ease of understanding as having a number of discrete functional components or modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

In the above embodiments, a number of software modules were described. As those skilled in the art will appreciate, the software modules may be provided in compiled or un-compiled form and may be supplied to the user communication devices, the base station, the mobility management entity, and the operator control node as a signal over a computer network, or on a recording medium. Further, the functionality performed by part or all of this software may be performed using one or more dedicated hardware modules or circuits. However, the use of software modules is preferred as it facilitates the updating of the user communication devices, the base station, the mobility management entity, and the operator control node in order to update their functionalities.

| Glossary of 3GPP terms: | |
|---|---|
| DL | Downlink |
| eNB | Evolved NodeB, E-UTRAN base station |
| EPC | Evolved Packet Core |
| EPS | Evolved Packet System |
| E-UTRA | Evolved UMTS Terrestrial Radio Access |
| E-UTRAN | Evolved UMTS Terrestrial Radio Access Network |
| GPRS | General Packet Radio System |
| HSS | Home Subscriber Server |
| LTE | Long Term Evolution (of UTRAN) |
| MME | Mobility Management Entity |
| NAS | Non-Access-Stratum |
| (E-)RAB | (EPS-) Radio Access Bearer |
| RRC | Radio Resource Control |
| SDT | Small Data Transmission |
| UE | User Equipment |
| UL | Uplink |
| UMTS | Universal Mobile Telecommunications System |

This application is based upon and claims the benefit of priority from United Kingdom patent application No. 1403819.4, filed on Mar. 4, 2014, the disclosure of which is incorporated herein in its entirety by reference.

REFERENCE SIGNS LIST 1 communication network
3-1a, 3-1b user communication device
3-2 MTC device
5 base station
7 core network
9 pool
9-1, 9-2 group
11-1, 11-2, 11-3, 11-4 MME
16 HSS
18 operator control node
31 transceiver circuit
33 antenna
35 user interface
37 controller
39 memory
41 operating system
43 communication control module
45 UE identification data
51 transceiver circuit
53 antenna
55 network interface
57 controller
59 memory 61 operating system
63 UE communication control module
65 MME communication control module
66 MME selection module
67 UE identification data
68 MME type data
69 MME WF data
71 transceiver circuit
75 network interface
77 controller
79 memory
81 operating system
83 base station communication control module
85 operator control node communication control module
87 MME type data
89 MME WF data
91 transceiver circuit
95 network interface
97 controller
99 memory
101 operating system
103 network monitoring module
105 MME configuration module
107 MME type configuration data
108 MME WF configuration data
109 operator policy data

The invention claimed is:

1. A method performed by a Mobility Management Entity, MME, that serves each of a plurality of networks dedicated to respectively serve a specific type of subscriber user equipment of a plurality of specific types of subscriber user equipment, the method comprising:
receiving, for each of said plurality of networks dedicated to serve a specific type of subscriber user equipment of the plurality of specific types of subscriber user equipment, a respective weight factor; and
sending, to a base station with which the MME is associated, a message that respectively includes a weight factor for each specific type of the plurality of specific types of subscriber user equipment which the MME supports.

2. The method according to claim 1, wherein the weight factor for each of the specific types of subscriber user equipment which the MME supports is provided to the base station by the MME at connection establishment.

3. The method according to claim 2, wherein the weight factor for each of the specific types of subscriber user equipment which the MME supports is provided to the base station by the MME as part of an S1 setup procedure.

4. The method according to claim 1, wherein the weight factor for each of the specific types of subscriber user equipment which the MME supports is provided to the base station by the MME as part of an MME configuration update procedure.

5. The method according to claim 4, wherein the weight factor for each of the specific types of subscriber user equipment which the MME supports is provided to the base station by the MME in an MME configuration update message.

6. The method according to claim 1, wherein each weight factor is a relative MME capacity.

7. The method according to claim 6, wherein the MME forms part of an MME pool, and wherein each weight factor represents a capacity of the MME relative to the capacity of other MMEs within the MME pool.

8. A Mobility Management Entity, MME, for serving each of a plurality of networks dedicated to respectively serve a specific type of subscriber user equipment of a plurality of specific types of subscriber user equipment, the MME comprising:
a transceiver circuit configured to receive, for each of the plurality of networks dedicated to serve a specific type of subscriber user equipment, a respective weight factor,
wherein the transceiver circuit is further configured to send, to a base station with which the MME is associated, a message that respectively includes a weight factor for each specific type of the plurality of specific types of subscriber user equipment which the MME supports.

9. A method performed by a base station arranged to wirelessly communicate with a plurality of specific types of subscriber user equipment, UE, and with a plurality of Mobility Management Entities, MMEs, wherein each MME is configured to serve a respective plurality of networks, wherein each network served by a given MME is dedicated to respectively serve a specific type of subscriber user equipment of the plurality of specific types of subscriber user equipment, the method comprising:
receiving, from at least one MME, a respective weight factor for each of said plurality of networks dedicated to serve a specific type of subscriber user equipment of the plurality of specific types of subscriber user equipment served by the at least one MME; and
selecting at least one MME to which to direct a UE of a specific type of the plurality of specific types of UE, based on the weight factors received for the plurality of specific types of subscriber user equipment from the at least one MME.

10. A method as claimed in claim 9, wherein the selecting directs a UE for the purposes of load balancing between MMEs that serve a given network dedicated to respectively serve a specific type of subscriber user equipment.

11. A base station arranged to wirelessly communicate with a plurality of specific types of subscriber user equipment, UE, and with a plurality of Mobility Management Entities, MMEs, configured to serve each of a plurality of networks dedicated to respectively serve a specific type of subscriber user equipment of the plurality of specific types of subscriber user equipment, the base station comprising:
a transceiver circuit configured to receive, from at least one MME, a respective weight factor for each of said plurality of networks dedicated to serve a specific type of subscriber user equipment of the plurality of specific types of subscriber user equipment served by the at least one MME; and
a processor configured to select at least one MME to which to direct a UE of a specific type of the plurality of specific types of UE, based on the weight factors received for the plurality of specific types of subscriber user equipment from the at least one MME.

12. A method performed by an operator node for controlling a Mobility Management Entity, MME, that serves each of a plurality of networks dedicated to respectively serve a specific type of subscriber user equipment of a plurality of specific types of subscriber user equipment, the method comprising:
providing, to said MME for each of said plurality of networks dedicated to serve a specific type of subscriber user equipment of the plurality of specific types of subscriber user equipment, a respective weight factor.

13. An operator node for controlling a Mobility Management Entity, MME, that serves each of a plurality of networks dedicated to respectively serve a specific type of subscriber user equipment of a plurality of specific types of subscriber user equipment, the operator node comprising:
- a transceiver circuit configured to provide, to said MME for each of said plurality of networks dedicated to serve a specific type of subscriber user equipment of the plurality of specific types of subscriber user equipment, a respective weight factor.

14. A communication system comprising:
- at least one Mobility Management Entity, MME, for serving each of a plurality of networks dedicated to respectively serve a specific type of subscriber user equipment of a plurality of specific types of subscriber user equipment, the MME comprising:
    - a transceiver circuit configured to receive, for each network dedicated to serve a specific type of subscriber user equipment of the plurality of specific types of subscriber user equipment, a respective weight factor,
    - wherein the transceiver circuit is further configured to send, to a base station with which the MME is associated, a message that respectively includes a weight factor for each specific type of the plurality of specific types of subscriber user equipment which the MME supports; and
- at least one base station arranged to wirelessly communicate with a plurality of specific types of subscriber user equipment, UE, and with a plurality of Mobility Management Entities, MMEs, configured to serve each of a plurality of networks dedicated to respectively serve a specific type of subscriber user equipment of the plurality of specific types of subscriber user equipment, the base station comprising:
    - a transceiver circuit configured to receive, from at least one MME, a respective weight factor for each of said plurality of networks dedicated to serve a specific type of subscriber user equipment served by the at least one MME; and
    - a processor configured to select at least one MME to which to direct a UE of a specific type of the plurality of specific types of UE, based on the weight factors received from the at least one MME.

15. A non-transitory computer implementable program product causing:
- a programmable Mobility Management Entity, MME, to perform a method that serves each of a plurality of networks dedicated to respectively serve a specific type of subscriber user equipment of a plurality of specific types of subscriber user equipment, the method comprising:
    - receiving, for each of said plurality of networks dedicated to serve a specific type of subscriber user equipment of the plurality of specific types of subscriber user equipment, a respective weight factor; and
    - sending, to a base station with which the MME is associated, a message that respectively includes a weight factor for each specific type of the plurality of specific types of subscriber user equipment which the MME supports; and
- a programmable base station apparatus to perform a method, wherein the base station is arranged to wirelessly communicate with a plurality of specific types of subscriber user equipment, UE, and with a plurality of Mobility Management Entities, MMEs, wherein each MME is configured to serve a respective plurality of networks, wherein each network served by a given MME is dedicated to respectively serve a specific type of subscriber user equipment of the plurality of specific types of subscriber user equipment, the method comprising:
    - receiving, from at least one MME, a respective weight factor for each of said plurality of networks dedicated to serve a specific type of subscriber user equipment served by the at least one MME; and
    - selecting at least one MME to which to direct a UE of a specific type of the plurality of specific types of UE, based on the weight factors received for the plurality of specific types of subscriber user equipment from the at least one MME.

* * * * *